United States Patent [19]

Aubrun et al.

[11] Patent Number: 5,359,520

[45] Date of Patent: Oct. 25, 1994

[54] ADAPTIVE ERROR CORRECTION CONTROL SYSTEM FOR OPTIMIZING MIRROR POSITIONING IN A SPATIAL CHOPPING OR SCANNING TELESCOPE

[75] Inventors: Jean-Noel Aubrun, Mountain View; Kenneth R. Lorell, Los Altos; Paul J. Reshatoff, Menlo Park, all of Calif.

[73] Assignee: Lockheed Missiles & Space Company, Inc., Sunnyvale, Calif.

[21] Appl. No.: 895,313

[22] Filed: Jun. 8, 1992

Related U.S. Application Data

[63] Continuation-in-part of Ser. No. 892,855, Jun. 3, 1992, Pat. No. 5,245,830.

[51] Int. Cl.$^5$ .................. G05B 13/02; G05B 19/18; G05B 5/10
[52] U.S. Cl. .................. 364/148; 364/164; 364/165; 364/167.01; 364/525; 359/843
[58] Field of Search .......... 364/148, 164, 165, 167.01, 364/525; 359/843, 850

[56] References Cited

U.S. PATENT DOCUMENTS

| | | | |
|---|---|---|---|
| 3,881,184 | 4/1975 | Koepcke et al. | 360/78 |
| 4,071,744 | 1/1978 | Pollock | 364/164 |
| 4,389,849 | 6/1983 | Gasser et al. | 62/6 |
| 4,397,155 | 8/1983 | Davey | 62/6 |
| 4,467,186 | 8/1984 | Goralnick et al. | 318/632 |
| 4,543,793 | 10/1985 | Chellis et al. | 62/6 |
| 4,567,726 | 2/1986 | Vitale et al. | 60/520 |
| 4,694,228 | 9/1987 | Michaelis | 318/341 |
| 4,825,055 | 4/1989 | Pollock | 235/411 |
| 4,913,534 | 4/1990 | Goff | 364/165 |
| 5,109,349 | 4/1992 | Ulich et al. | 364/525 |
| 5,119,287 | 6/1992 | Nakamura et al. | 364/148 |

FOREIGN PATENT DOCUMENTS

| 0130248 | 1/1985 | European Pat. Off. . |
|---|---|---|
| 0307586 | 3/1989 | European Pat. Off. . |
| 0342973 | 11/1989 | European Pat. Off. . |
| 2043964 | 10/1980 | United Kingdom . |

OTHER PUBLICATIONS

K. R. Lorell, R. R. Clappier, W. F. Barrows & G. K. Lee "A Microprocessor-based Position Control System for a Telescope Secondary Mirror" *Automatica*, vol. 20, No. 3, pp. 295-308, 1984. month unknown.

*Primary Examiner*—Jerry Smith
*Assistant Examiner*—Paul Gordon
*Attorney, Agent, or Firm*—Donald C. Feix

[57] ABSTRACT

An adaptive control includes a digital error correction system (DECS) to reduce control system error to near zero by anticipating a problem and feeding forward in time a correction to deal with the problem before it happens. The adaptive control is used in a controlled system of the kind which is cyclical in operation and which operates in response to repetitive cycle commands so that the operation of the system is substantially predictable for a significant number of cycles of operation. The adaptive control is incorporated in a spatial chopping or scanning telescope system of the kind in which a telescope mirror is moved in repetitive cycle motions and in a rigidly prescribed pattern between varied orientations and wherein the mirror is held for a prescribed, relatively long period of time in each orientation and is moved rapidly in a relatively short period of time from one orientation to another. The adaptive control permits accurate control of the command waveform frequency and shape, enables the telescope system to keep position error near zero by using, in combination with the feedback loop, a feed forward loop directly driving the actuators during the transition period and actively holding the mirror in position during the dwell periods. The adaptive control provides the ability to eliminate overshoot and ringing, because the force command provides the precise amount of braking required to exactly stop the mirror motion.

15 Claims, 10 Drawing Sheets

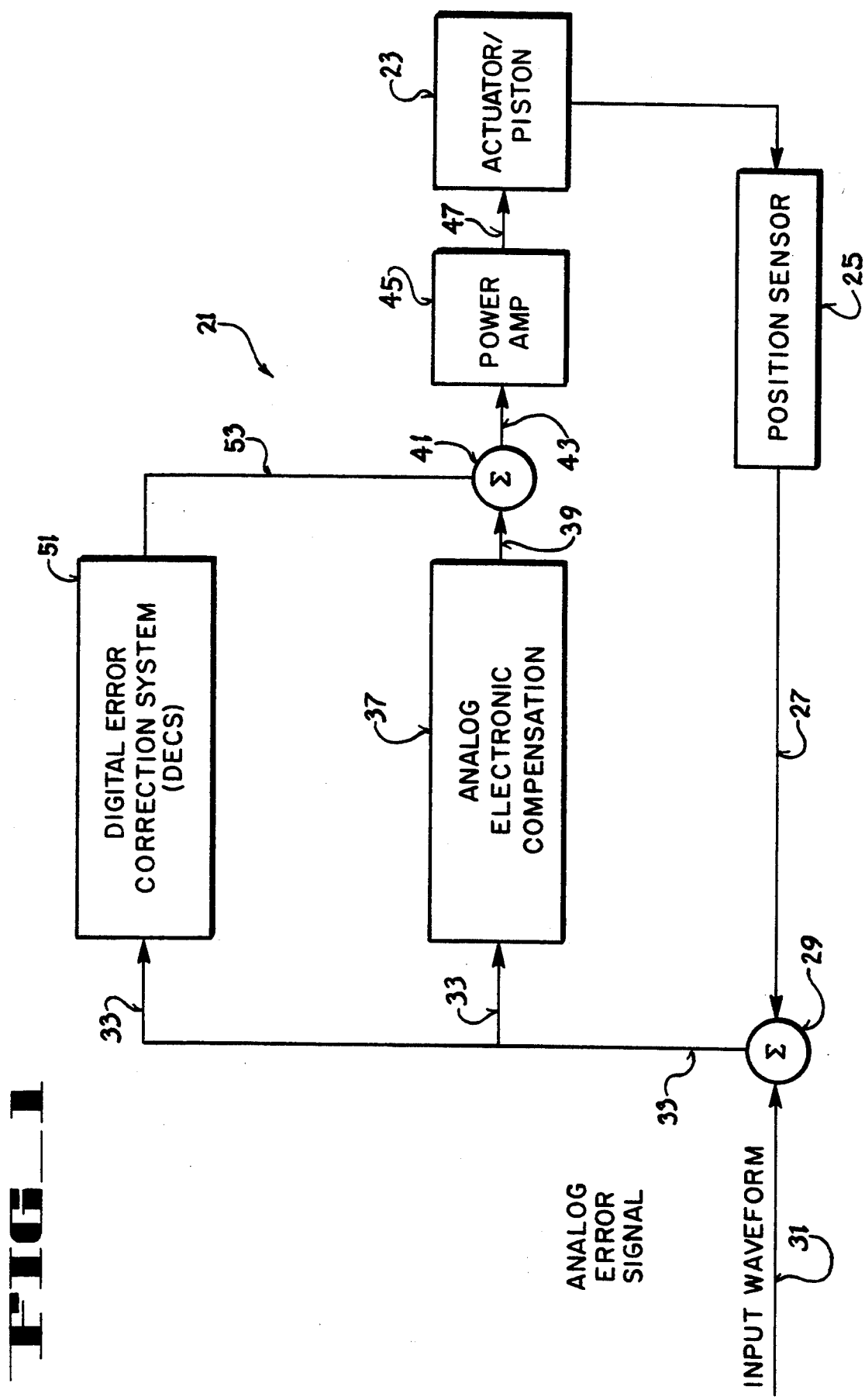
FIG_1

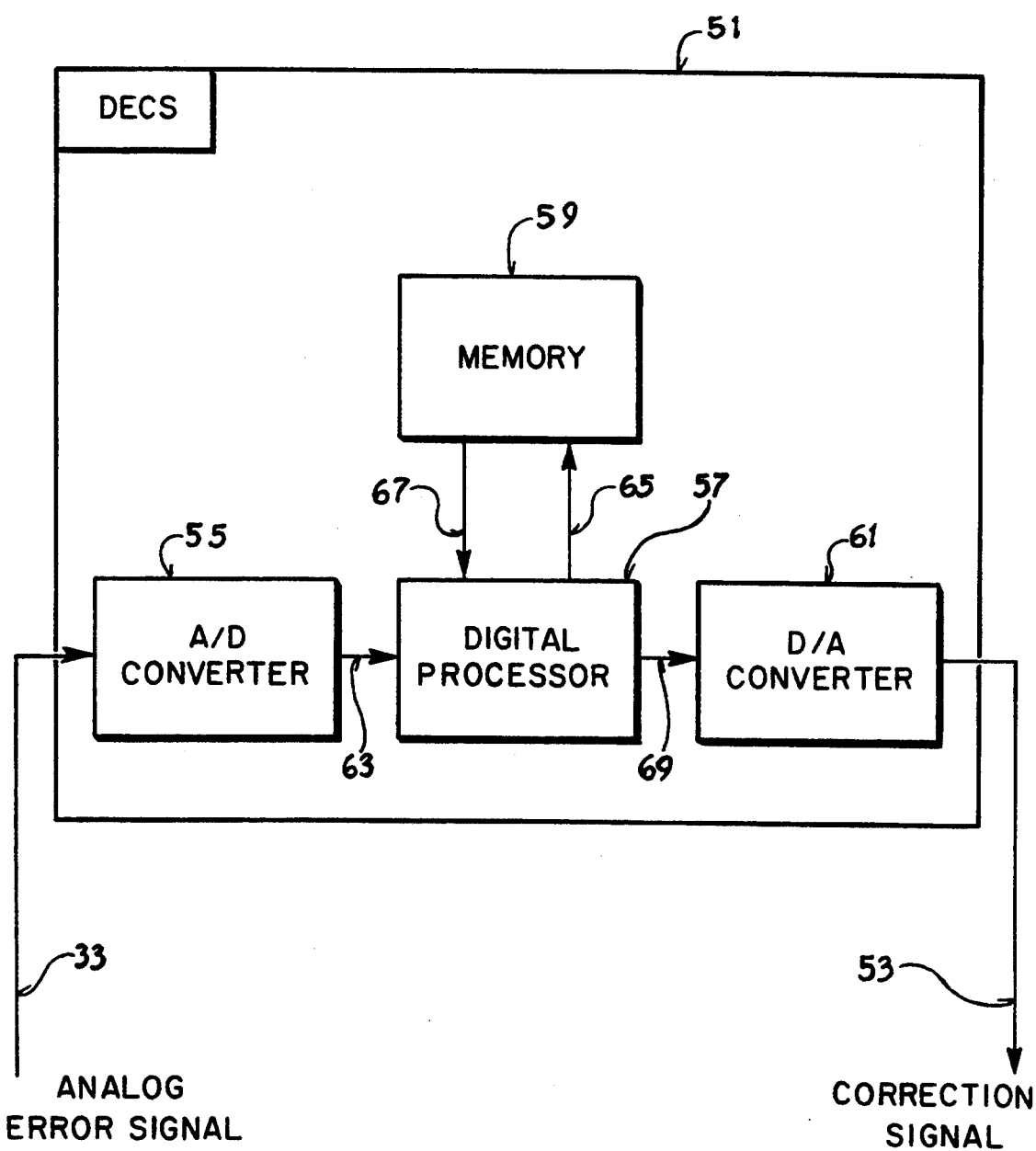

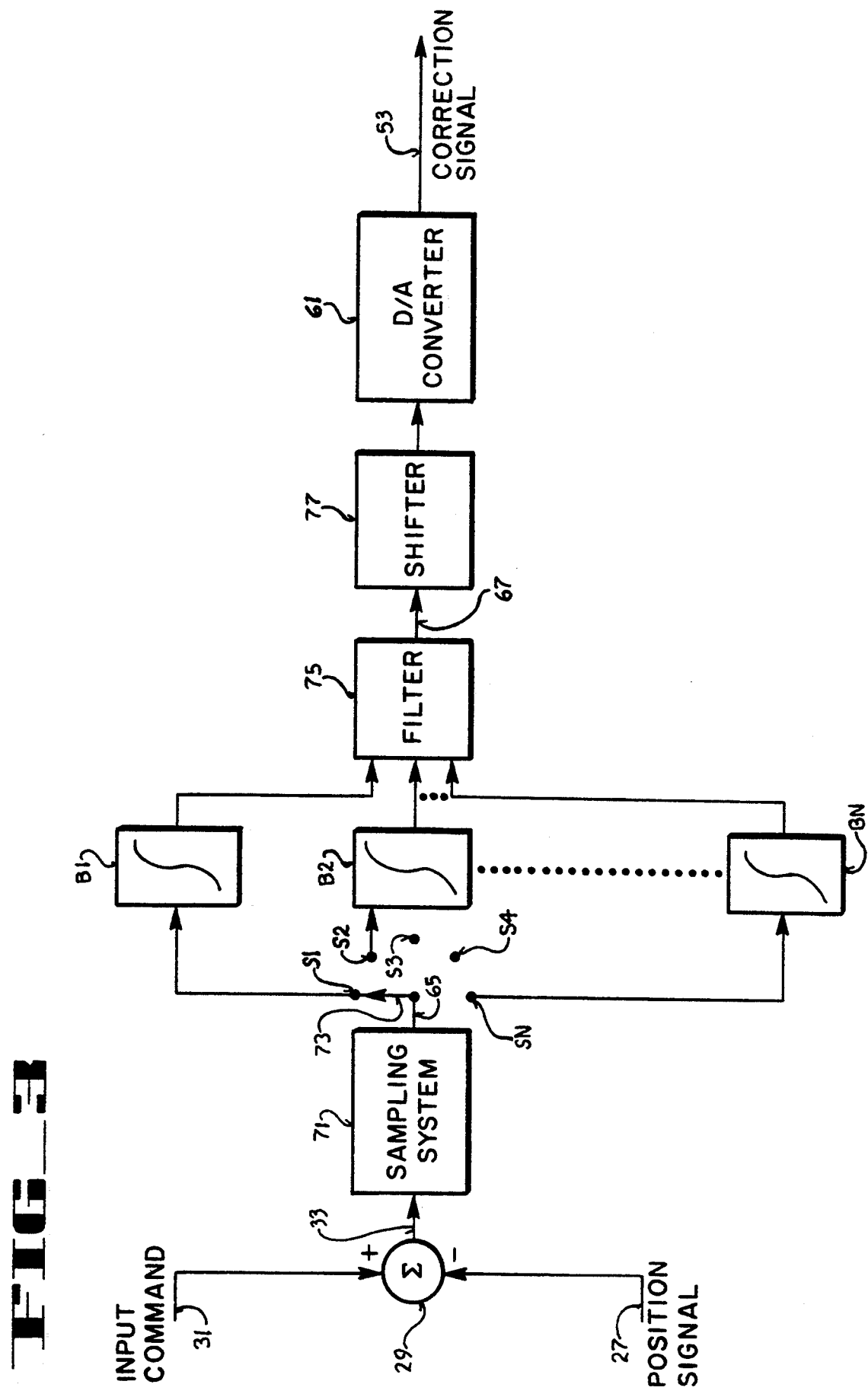

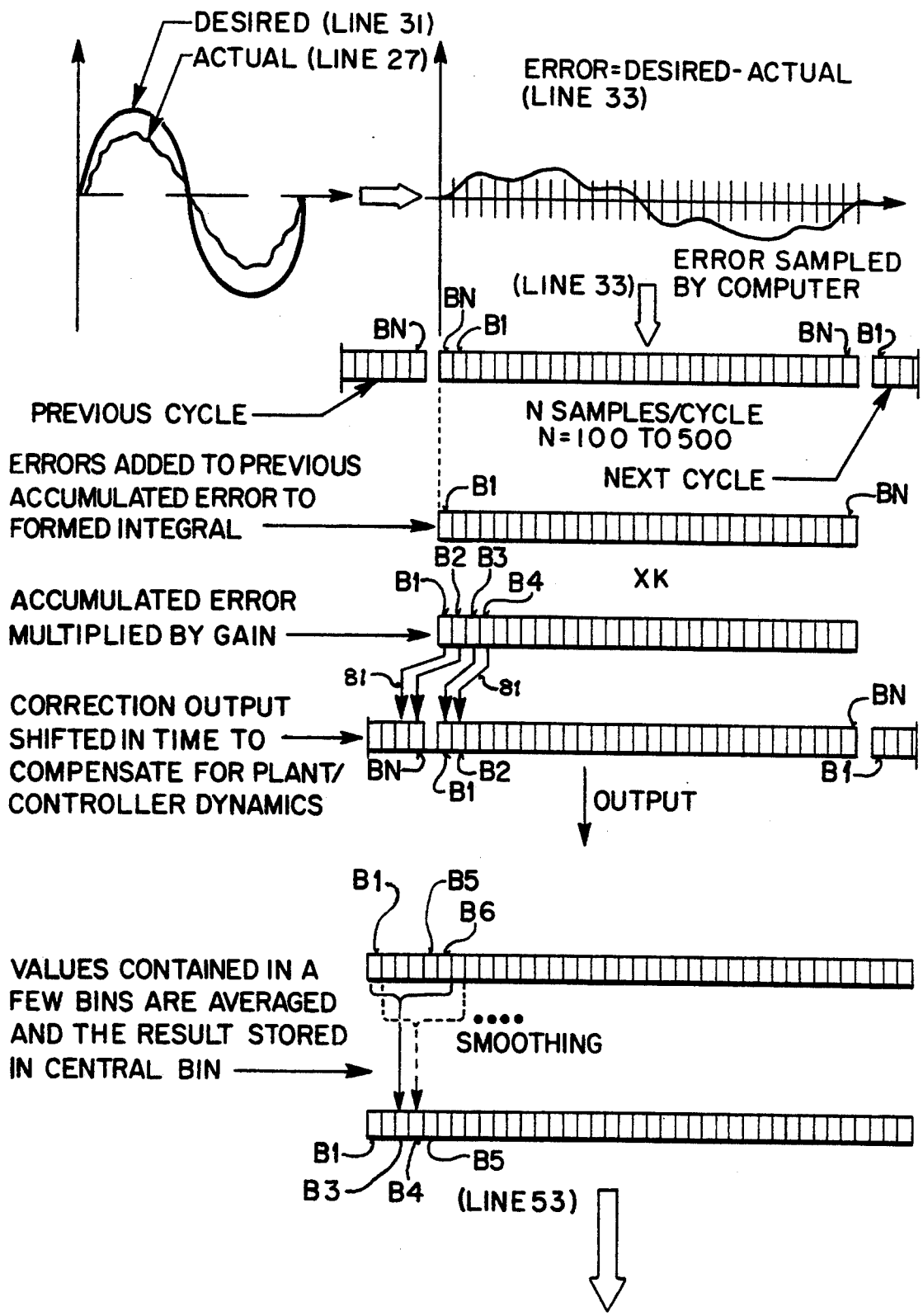

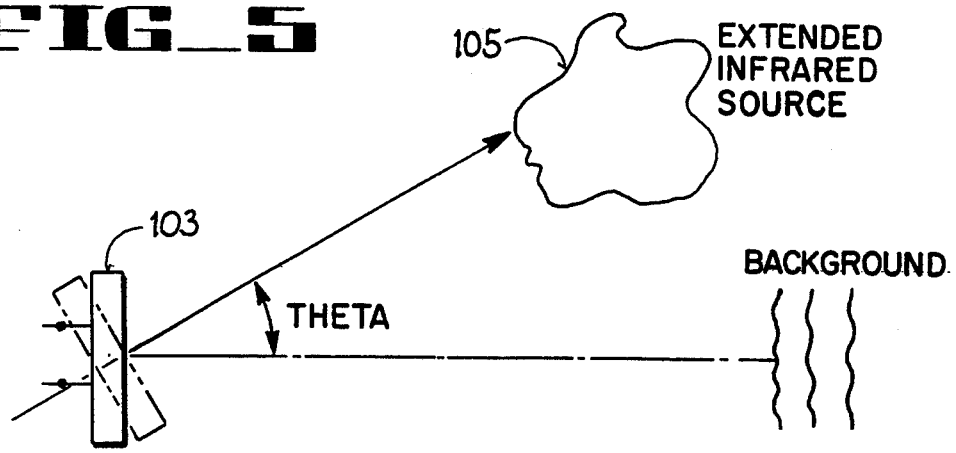
FIG_5
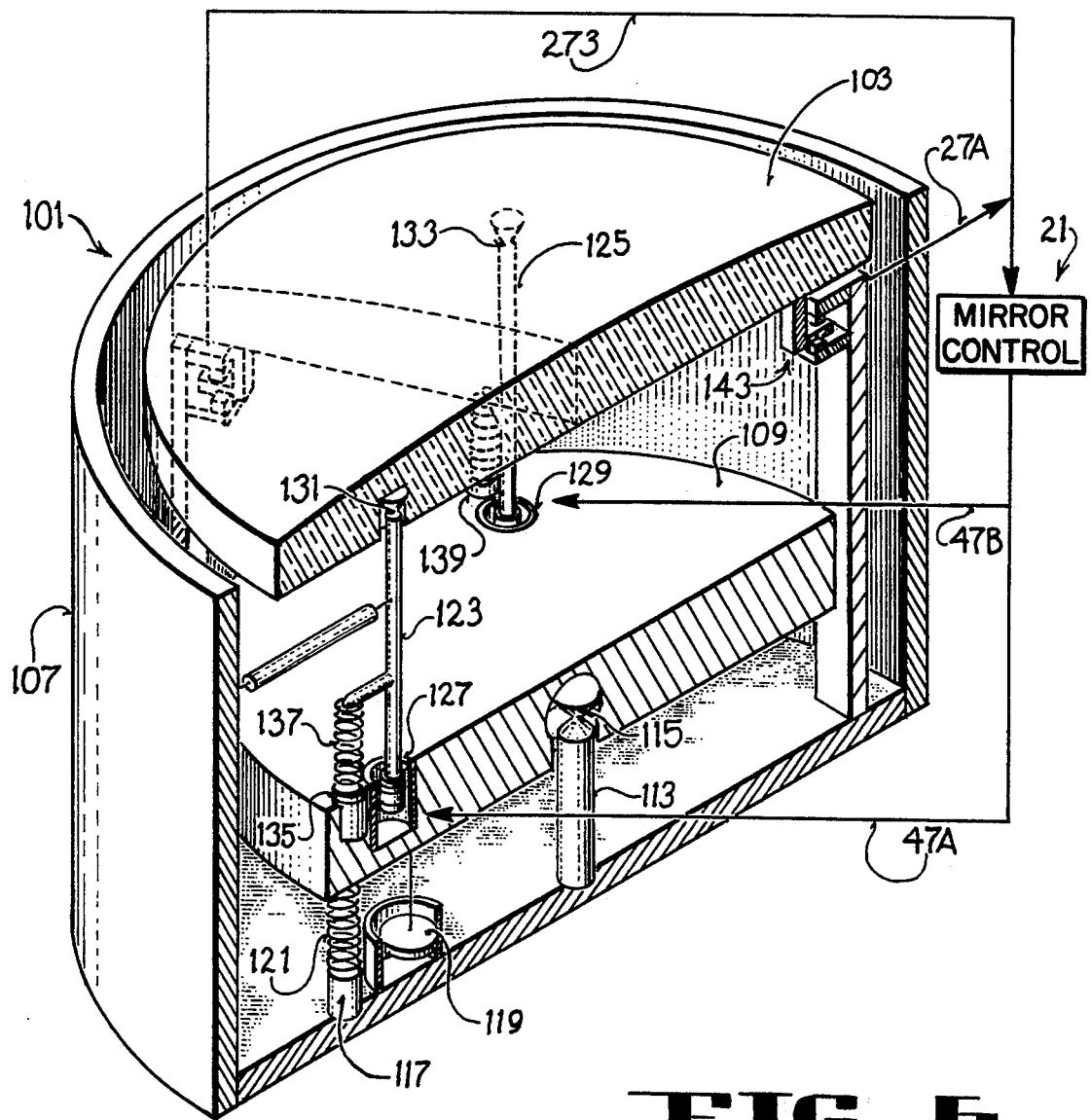
FIG_6

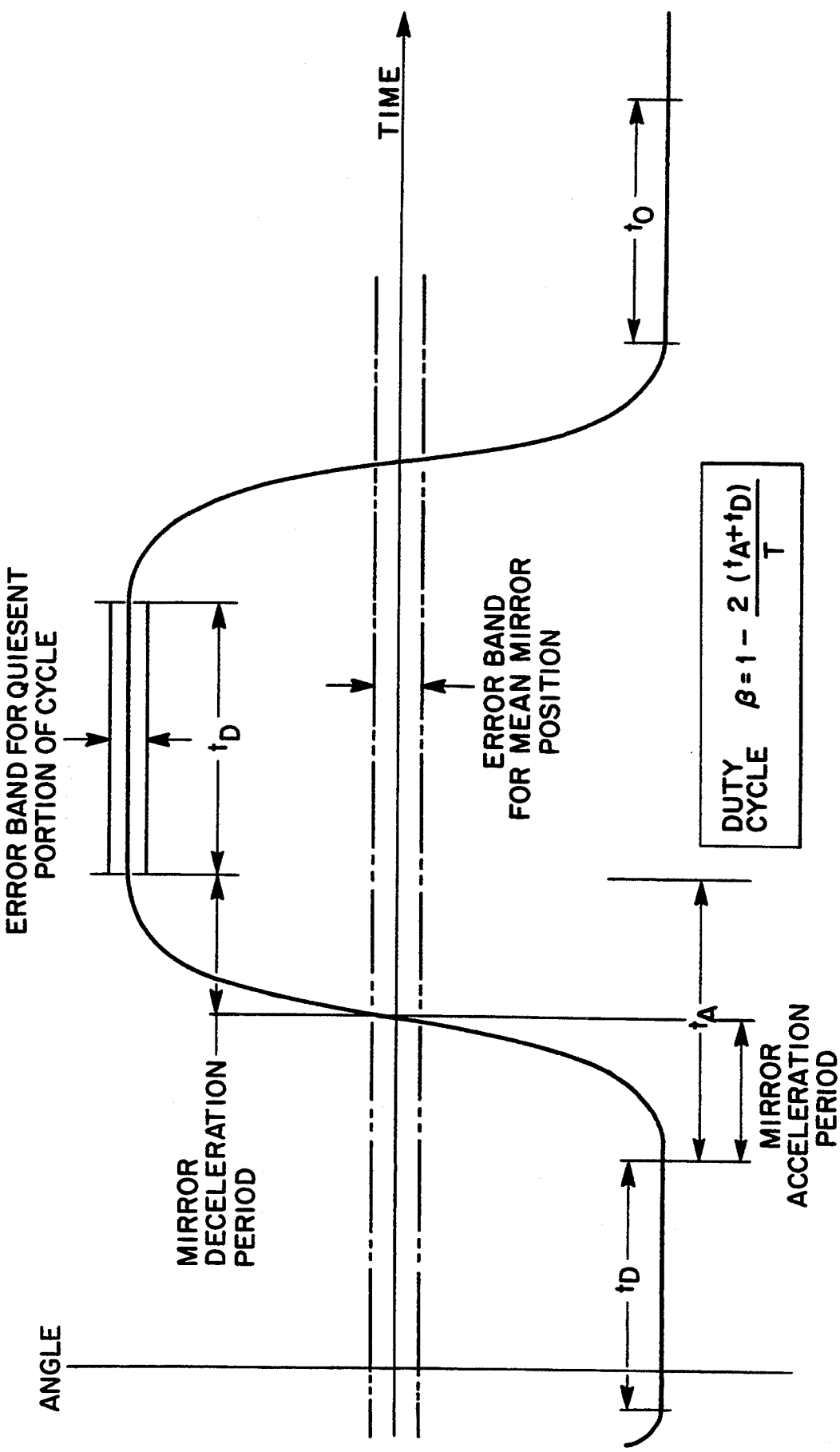

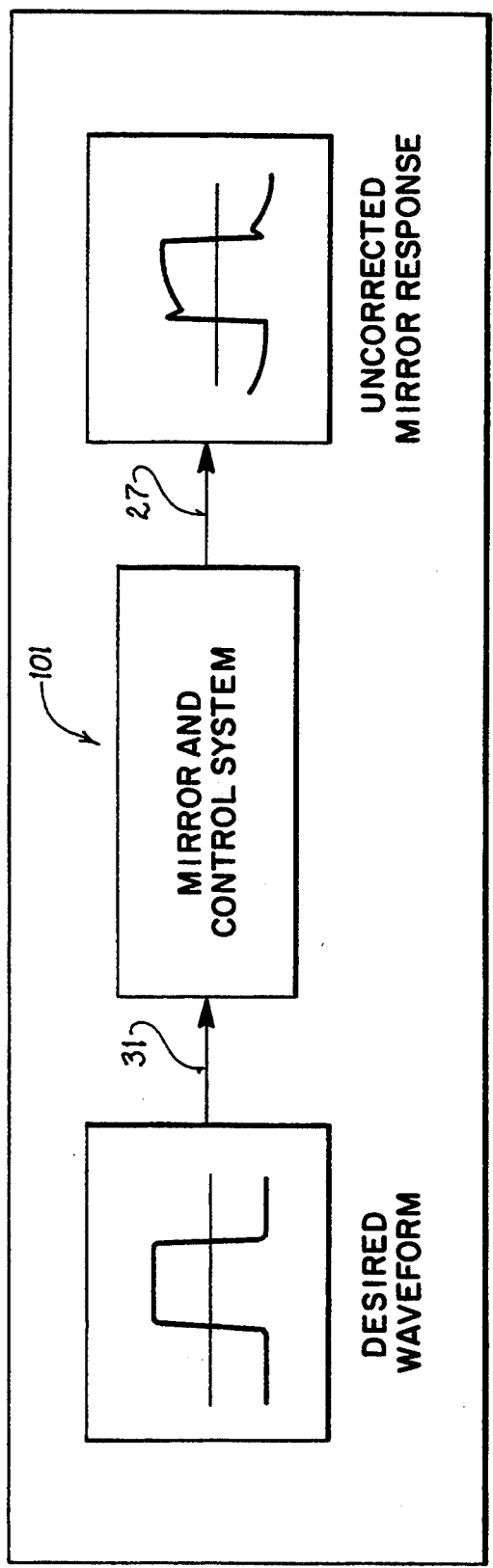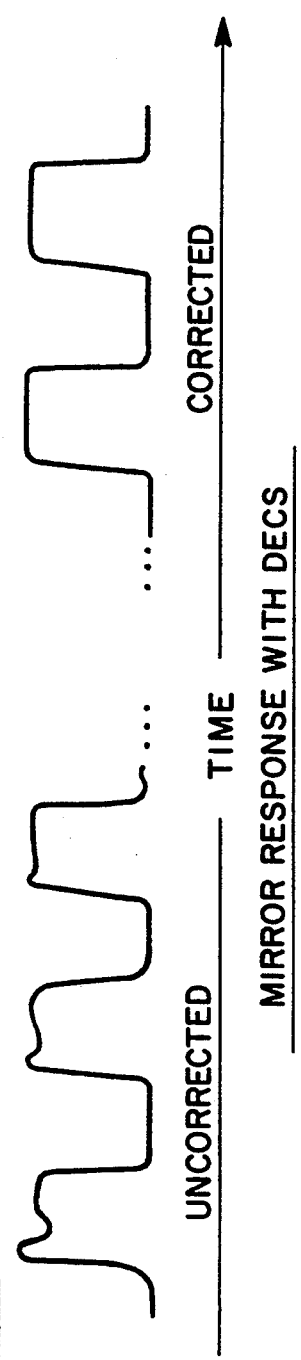
FIG. 8
FIG. 9

FIG_10

FIG. 12

ADAPTIVE ERROR CORRECTION CONTROL SYSTEM FOR OPTIMIZING MIRROR POSITIONING IN A SPATIAL CHOPPING OR SCANNING TELESCOPE

CROSS REFERENCE TO RELATED U.S. PATENT NO. 5,245,830 ISSUED SEP. 21, 1993.

This application is a continuation-in-part of a pending U.S. Patent No. 5,245,830 Ser. No. 07/892,855 entitled "ADAPTIVE ERROR CORRECTION CONTROL SYSTEM FOR OPTIMIZING STIRLING REFRIGERATOR OPERATION", filed on Jun. 3, 1992, issued Sep. 21, 1993, and assigned to the same assignee as the assignee of this application. This application claims the benefit of the filing date for the subject matter which is common to the parent application filed Jun. 3, 1992.

BACKGROUND OF THE INVENTION

This invention relates to an adaptive error correction control system which includes a digital error correction system (DECS).

This invention relates particularly to an adaptive error correction control system which includes a DECS for optimizing mirror positioning in a spatial chopping or scanning telescope system.

The adaptive control of the present invention reduces control system error to near zero by anticipating a problem and feeding forward in time a correction to deal with the problem before it happens. The adaptive control is used in a controlled system of the kind which is cyclical in operation and which operates in response to repetitive cycle commands so that the operation of the system is substantially predictable for a significant number of cycles of operation.

Conventional analog feedback controls feed an analog error signal into a control loop which is designed to reduce and/or to eliminate the error. An analog feedback control loop of this kind can be effective to reduce error to a substantial extent; but the analog feedback control loop may not function satisfactorily when it is necessary to reduce the error to near zero.

An analog system, by its nature, does not remember anything; so it does not remember the history of a cycle. An analog system is reactive, whereas an error correction system which reduces error to near zero needs to be proactive. An error correction system which can reduce error to near zero needs to know what went wrong in the past so that it can feed forward in time a correction to deal with a problem before it happens. Such an error correction system needs to know exactly what error correction is needed at each point in a cycle of operation and needs to feed forward an appropriate correction and also to apply the correction at a time interval far enough in advance of the time when the correction is needed so as to balance the system dynamics.

SUMMARY OF THE PRESENT INVENTION

The present invention provides an adaptive control which includes a digital error correcting system (DECS) effective to reduce control system error to near zero.

The adaptive control of the present invention will operate effectively in a controlled system of the kind which is cyclical in operation and which operates in response to repetitive cycle commands so that the operation of the system is substantially predictable for a significant number of cycles of operation.

The adaptive error correction control of the present invention is utilized, in one embodiment of the present invention, for optimizing mirror positioning in a spatial chopping or scanning telescope system of the kind in which a telescope mirror is moved back and forth, in repetitive cycle motions and in a rigidly prescribed pattern, between varied orientations and wherein the mirror is held for a prescribed, relatively long period of time in each orientation and is moved rapidly in a relatively short period of time from one orientation to the other.

The adaptive control measures, during a cycle of operation, the error between a desired cycle command and an output signal representing actual system operation.

The adaptive control slices the measured error into a selected number of equal time based segments.

The error data in these time based segments are stored in related, separate storage areas over a number of cycles. The data accumulated in each storage area accurately represents the correction required during that time segment of the cycle.

The present invention shifts the correction data in each storage area forward in time, with respect to the time segment in the cycle at which the data was accumulated, by an amount of time represented by a selected number of the time based segments. This enables the correction to have a lead time required to balance the system dynamics.

The present invention smooths, by a local averaging process, the effect of random noise which may become stored in one or more of the separate storage areas.

The smoothed, time shifted, error correction data is converted to a form which can be combined with the desired cycle command, and the converted data is combined with the desired cycle command to produce an adapted, desired cycle command for reducing control system error to near zero.

In the spatial chopping or scanning telescope system embodiment of the present invention, an actuator actively holds the mirror at one orientation, moves the mirror to a another orientation, actively holds the mirror at the other orientation, and moves the mirror back to the first orientation during each cycle of operation. The desired wave form command is essentially a square wave, but it preferably is generated in a way to provide a shaped position command having smooth acceleration and deceleration sections, to eliminate or to minimize the excitation of structural vibrations.

By accurate, adaptive control of the wave form frequency and shape, the mirror position error is kept near zero by using, in combination with a feedback loop, a feed forward loop directly driving the mirror actuators during the transition period.

The force feed forward technique (compared with a standard position-command-only controller technique) provides the benefit of the ability to eliminate overshoot and ringing, because the force command provides the precise amount of braking required to exactly stop the mirror motion.

Adaptive control methods and apparatus which incorporate the features noted above and which are effective to function as described above comprise specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a block diagram view of an adaptive control, constructed in accordance with one embodiment of the invention, for reducing control system error to near zero.

FIG. 2 is a block diagram view showing details of the digital error correction system (DECS) component of the adaptive control shown in FIG. 1. FIG. 2 shows an embodiment of the invention in which correction data is stored in digital memory.

FIG. 3 is a view illustrating, in diagrammatic form, how the digital processor of FIG. 2 samples the error measured during a cycle of operation, divides the measured error into a selected number of equal time based segments, and stores each segment in a separate storage area (an address area in the memory of FIG. 2—a bin B in FIG. 4).

FIG. 4 is a diagrammatic view which illustrates how the adaptive control method and apparatus of the present invention operate during one cycle of operation of the system which is controlled by the adaptive control of FIG. 1. FIG. 4 illustrates the various steps involved in the adaptive control method and apparatus and also illustrates how the steps are sequenced and how the steps are operatively associated with one another.

FIG. 5 is a diagrammatic view showing how a mirror of a spatial chopping or scanning telescope system constructed in accordance with one embodiment of the present invention is moved back and forth between varied orientations to permit a continuous comparison of an object-field containing background radiation only with a nearby field containing background radiation plus source radiation (in this case an extended infrared source).

FIG. 6 is an isometric view, partially cut away and in cross section to show details of construction, of a spatial chopping or scanning telescope system having three axes of mirror control. Two of the axes are tilting axes (the azimuth and the elevation), and one axis is the in-and-out axis (the focus).

FIG. 7 is a diagram showing a cycle of operation. The angle of the mirror is indicated on the vertical axis and is plotted against time on the horizontal axis. FIG. 7 is annotated with legends to indicate significant events and limits with respect to the cycle of operation.

FIG. 8 is a diagrammatic view illustrating the effect of system dynamics on the variation between the desired waveform and uncorrected mirror response.

FIG. 9 is a diagrammatic view illustrating how the adaptive control of the present invention is effective to change the uncorrected response to a corrected mirror response in which there is almost zero error between the corrected response and the desired waveform.

Figure 10:
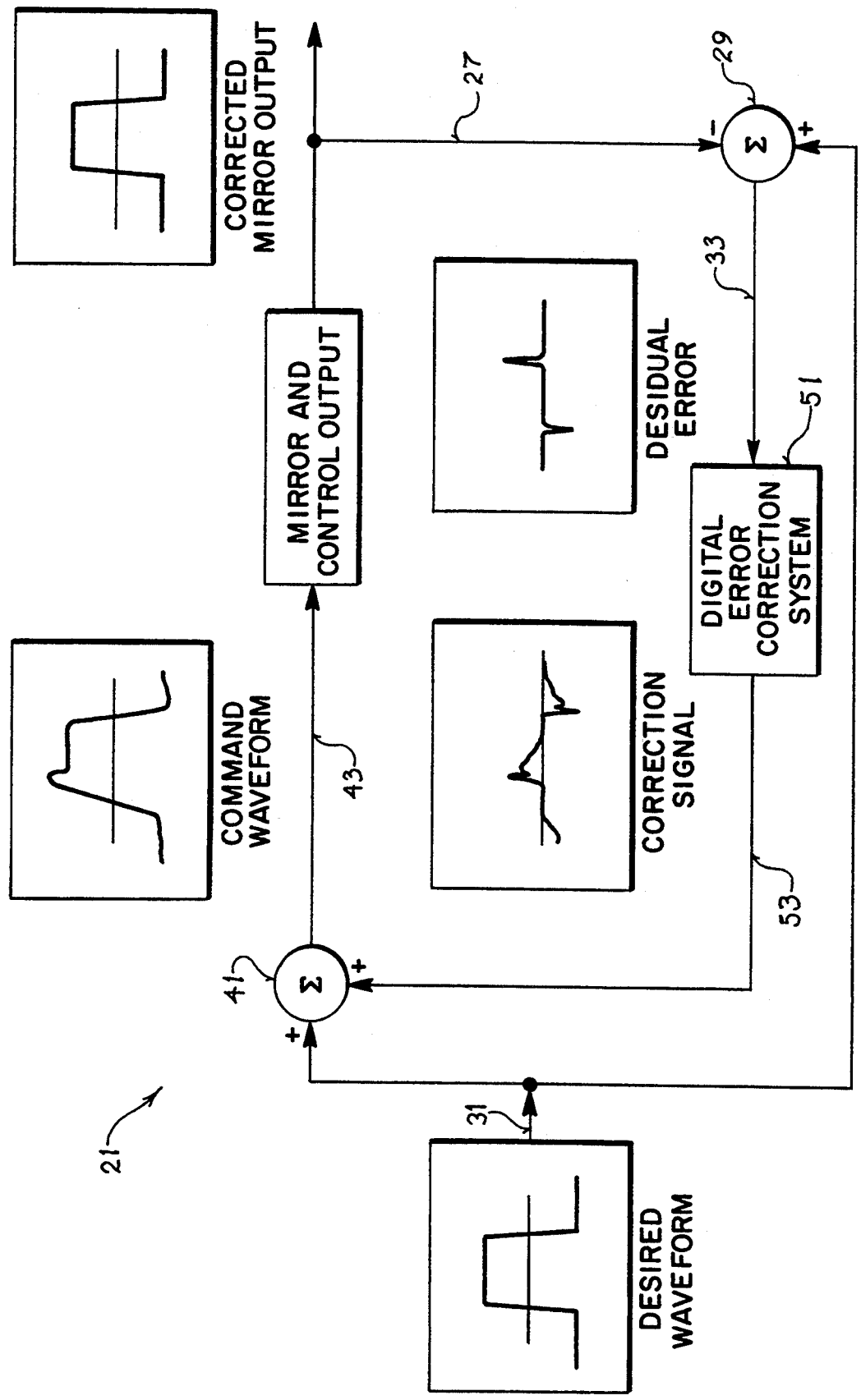

FIG. 10 is a diagrammatic view which shows (in diagram blocks) waveforms and signals existing at the indicated locations of components of the control for the mirror. FIG. 10 graphically illustrates how the digital error correction system of the present invention is effective to generate a cumulative correction signal which, when forward time shifted and combined with the desired waveform produces a modified, command waveform. The resulting command waveform produces a corrected mirror output which corresponds to the desired waveform with near zero error of the mirror position.

Figure 11:
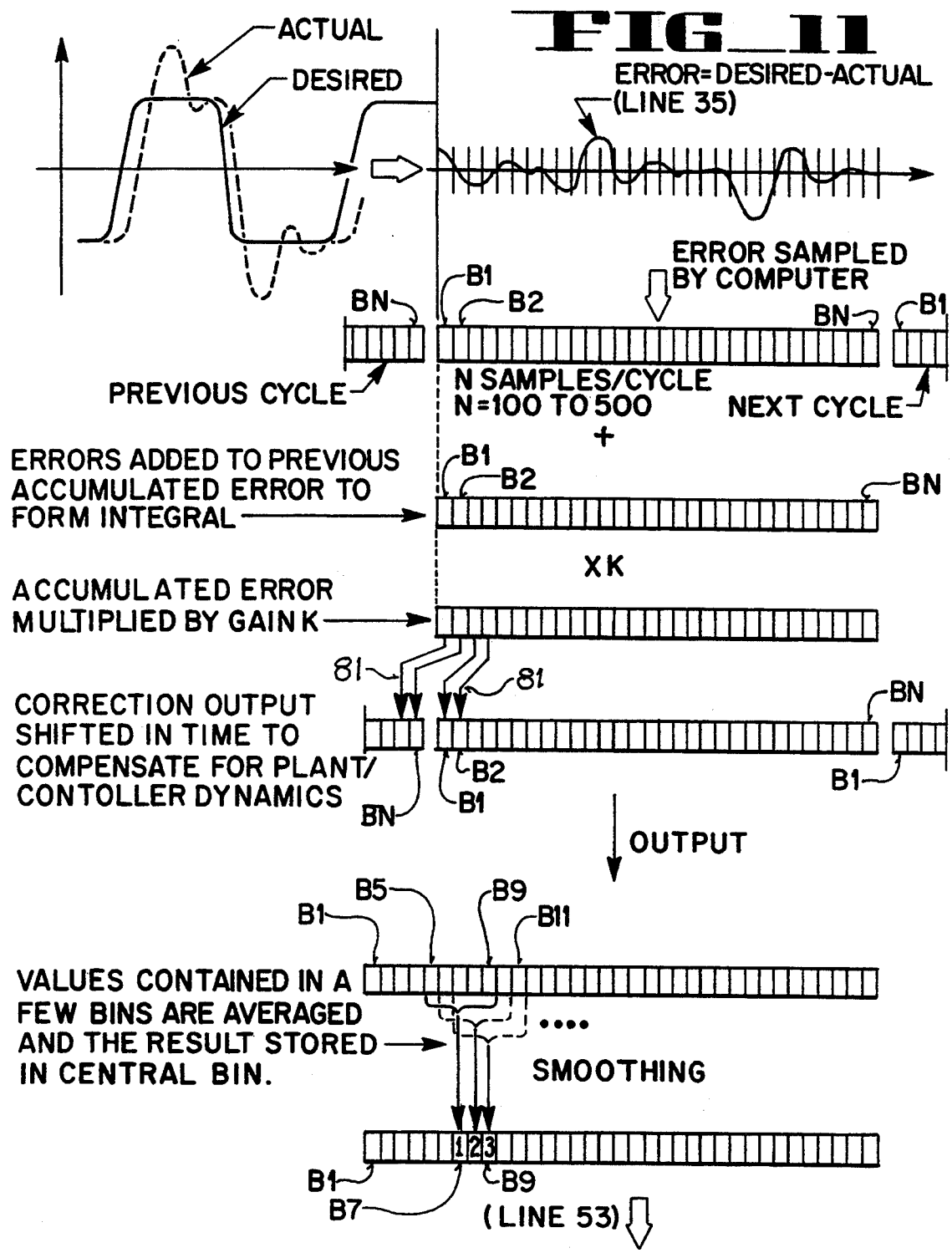

FIG. 11 is a view (generally similar to FIG. 4 above) showing the various steps involved in the adaptive control method and apparatus for obtaining near zero error in mirror positioning. FIG. 11 also shows how the steps are sequenced and how the steps are operatively associated with one another in producing the required correction to the desired waveform (essentially a square wave) for the mirror positioning control.

Figure 12:
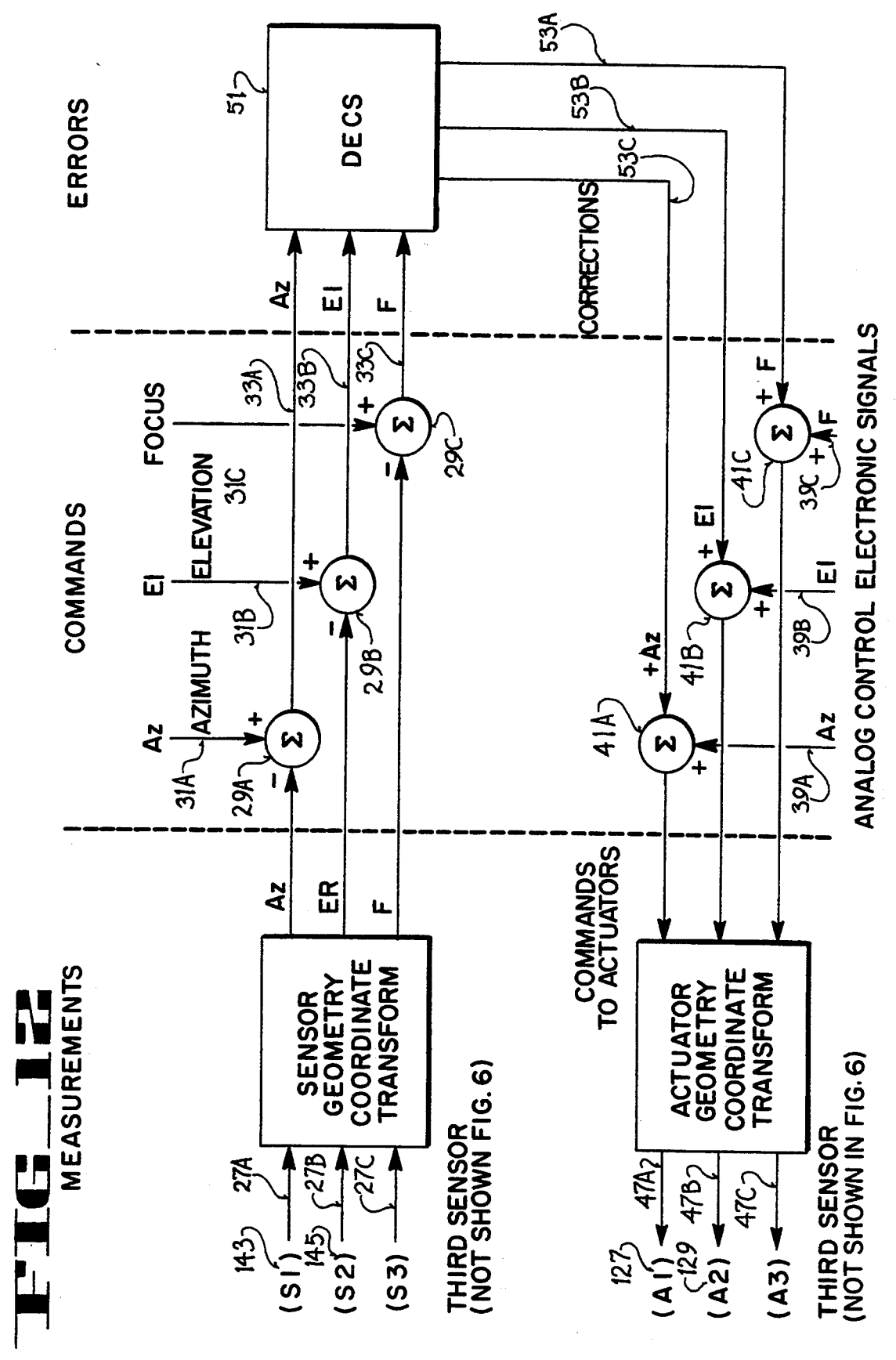

FIG. 12 illustrates how three separate desired waveforms are input for the respective azimuth, elevation and focus positioning of the mirror. FIG. 12 illustrates how the adaptive control of the present invention coacts with the three respective sensed position signals to produce three respective correction signals. The three correction signals are effective to achieve near zero position error in the respective azimuth, elevation and focus positions of the mirror during all portions of each cycle of operation.

DETAILED DESCRIPTION OF THE PREFERRED EMBODIMENTS

FIG. 1 is a block diagram view of an adaptive control, constructed in accordance with one embodiment of the present invention, for reducing control system error to near zero. The adaptive control is indicated by the general reference numeral 21. The adaptive control 21 reduces control system error to near zero by anticipating a problem and feeding forward in time a correction to deal with a problem before it happens, as will be described in more detail below with particular reference to FIG. 4.

The adaptive control 21 functions in a controlled system of the kind which is cyclical in operation and which operates in response to repetitive cycle commands so that the operation of the system is substantially predictable for a significant number of cycles of operation.

In FIG. 1 the adaptive control 21 is illustrated as associated with an actuator/piston 23.

In this particular embodiment the error which is to be sensed and which is to be reduced to near zero is a position error.

While the adaptive control 21 in FIG. 1 is used to reduce position error to near zero, it should be noted that the adaptive control of the present invention can also be utilized to reduce other types of system errors to near zero, such as, for example, a vibration error or a force error. The adaptive control can be used where the error measured is a physical variable associated with the system and is an error which can be sensed directly or indirectly and is an error which can be used as an input to the adaptive control so as to make the sensed physical variable conform to a desired cyclical pattern including a constant value, such as near zero.

The position error of the actuator/piston 23 in the FIG. 1 embodiment is sensed by a position sensor 25 and is transmitted on a line 27 to a summing junction 29.

The desired cycle command, the input waveform, is transmitted to the summing junction by a line 31.

The difference between the desired cycle command waveform and the actual system operation waveform is output from the summing junction 29 as the analog error signal on a line 33.

This error signal on the line 33 is input into an analog electronic compensation module 37, and the output of the module 37 is transmitted, on a line 39, to a summing junction 41.

The output of the summing junction 41 is transmitted, on a line 43, to a power amplifier 45.

The output of the power amplifier, on a line 47, is transmitted to the actuator piston 23 to change the position of the actuator/piston.

The components of the adaptive control 21 as thus far described comprise components of a traditional analog feedback control for feeding an analog error signal into a control loop designed to reduce and/or to eliminate the error.

A traditional feedback control loop of this kind can be effective to reduce error to a substantial extent; but the traditional feedback control loop may not function satisfactorily when it is necessary to reduce the error to near zero.

An analog system, by its nature, does not remember anything, so it does not know the history of operation of a cycle. An analog system is reactive whereas an error correction system which reduces error to near zero needs to be proactive. An error correction system which can reduce error to near zero needs to know what went wrong in the past so that it can feed forward in time a correction to deal with a problem before it happens. Such an error correction system needs to know exactly what error correction is needed at each point in a cycle of operation and needs to feed forward an appropriate correction and also to apply the correction at a time interval far enough in advance of the time when the correction is needed so as to balance system dynamics.

As illustrated in FIGS. 1 and 2, the adaptive control 21 includes a digital error correcting system (DECS) module 51 which is effective to reduce control system to near zero.

As best illustrated in FIG. 2, the digital error correction system 51 comprises an analog to digital (A/D) converter 55, a digital processor 57, a memory 59, and a digital to analog (D/A) converter 61.

The A/D converter 55 receives the analog error signal from the line 33 and transmits a digital signal, on a line 63, to the digital processor 57.

The processor 57 is connected to the memory 59 by an output bus 65 and an input bus 67.

The digital processor transmits an output signal, on a line 69, to the D/A converter 61.

The correction signal from the D/A converter 61 is transmitted, on a line 53, to the summing junction 41.

The processing, within the digital error correction system module 51, of the analog error signal on the line 33 to produce the analog correction signal on the line 53 will be described in more detail below with reference to FIG. 3 and FIG. 4.

FIG. 3 is a view illustrating, in diagrammatic form, how the digital processor 57 of FIG. 2 samples the error measured during a cycle of operation, divides the measured error into a selected number of equal time based segments, and stores each segment in a separate storage area (an address area in the memory 59 of FIG. 2—a bin B in FIG. 4).

As illustrated in FIG. 3, the analog error signal on the output line 33 of the summing junction 29 is input into a sampling system module 71 (which can be visualized as including a rotary switch 73 stepped from switches S1 through SN during a cycle of operation) to direct equal time based segments of the error signal to separate storage areas B1, B2 . . . BN in the memory 59. The separate, digital outputs from each of these storage areas are filtered (in a filter 75), and are (by a shifter 77) shifted forward in time (as described in more detail below with reference to FIG. 4) with respect to the time segment in the cycle at which the data were accumulated.

The D/A converter 61 transmits the correction signal on the line 53 to the summing junction 41 shown in FIG. 1.

As noted above, the operation of the adaptive control method and apparatus of the present invention is graphically illustrated in FIG. 4. FIG. 4 illustrates the various steps involved in the adaptive control method and apparatus and also illustrates how the steps are sequenced and how the steps are operatively associated with one another.

As illustrated in FIG. 4, the desired cycle command, in this case a sine wave, is indicated by the "desired" legend in the upper left hand part of FIG. 4. This is the input waveform on line 31 of FIG. 1 and FIG. 3.

The output signal representing actual system operation is indicated by the legend "actual". This is the signal output from the position sensor on line 27 in FIGS. 1 and 3.

The error is the difference between the desired and the actual, and this analog error signal is the wavy line shown in the upper right hand part of FIG. 4. This is the analog error signal transmitted on line 33 in FIGS. 1, 2 and 3 of the drawings.

The error is sampled by the digital processor 57 in FIG. 2 and is divided into a selected number of samples per cycle. The measured error is thus time sliced and divided into a selected number of equal time based segments. The magnitude of the error in each segment is assigned a numerical quantity and is stored in a related, separate storage area B in the memory 59 (see memory 59 in FIG. 2 and bins B in FIG. 3 and FIG. 4).

It should be noted that, on each cycle of operation, if there is any error occurring at that particular point or time sliced segment in the cycle, then the numerical amount of that error is added to the amount previously stored in that particular storage area. This accumulation of error data in each storage area over a number of cycles accurately represents the correction required during that time segment of the cycle. This accumulation of error data is illustrated in the block entitled "CORRECTION SIGNAL" in FIG. 10.

The error data accumulated in each separate storage area is multiplied by a gain factor to control the rate of convergence between the adapted, desired cycle command and the output signal representing actual system operation. Multiplying by a low gain factor provides stability of operation but also produces a slow convergence. Multiplying by a higher gain factor produces a more rapid convergence; but, if the gain factor is too high, there may be problems in maintaining stability of operation.

It is an important feature of the present invention that the required correction output accumulated in each bin B (memory 59 storage area) is shifted forward in time, with respect to the time in the cycle at which the data was accumulated, by a selected amount of time, represented by a selected number of the time based segments (bins B), to enable the accumulated correction to have a lead time required to compensate for (to balance) system dynamics.

All systems have some lag between the time that a change is commanded and the time that the commanded change is actually executed. In mechanical systems there is a certain inertia which must be overcome. In electronic control systems there is a processing time and transmission time which come into play and which must be taken into consideration.

The forward shifting of the correction output is graphically illustrated by the shift arrows 81 in the lower right hand portion of FIG. 4.

Thus, the accumulated error in bin B3 is, for example, shifted forward by two time segment intervals to the bin B1 time segment of the next cycle. The accumulated error in bin B4 of one cycle is shifted forward in time to the bin B2 time segment of the next cycle, etc.

This enables the correction needed at each point in the cycle to be applied sufficiently far in advance of that time segment in the cycle so as to have the system operate in a way to eliminate the error which would otherwise occur at that point in the cycle.

The system is adaptive and is effective to reduce error to near zero; because, if the applied correction does not in fact remove the error at that exact point in the cycle, then the error occurring at that point in the cycle will continue to be measured and to be accumulated (with the previously existing correction in the appropriate bin) so that the adaptive signal on the line 43 will eventually produce an input signal to the power amplifier which will result in the actual signal on line 27 corresponding exactly to the desired input waveform on the line 31 except for cycle to cycle variations in noise.

These method and apparatus features of the present invention as thus far described with reference to FIG. 4 (and in particular the way in which the accumulated correction data functions to reduce the error to near zero) are further illustrated in diagrammatic form in FIGS. 9–12 and will be further described in detail below with reference to FIGS. 9–12.

With continued reference to FIG. 4, the present invention also includes smoothing for overcoming the effect of random noise which may become stored in one or more of the separate storage areas or bins.

Because random noise is random and is therefore not predictable, random noise can have severe consequences if adequate precautions are not taken to overcome the effects of random noise which may accumulate in one or more of the storage areas or bins.

In accordance with the present invention, the smoothing of the random noise is achieved by a local averaging process on correction data stored in a relatively small number of adjacent storage areas or bins. The local averaging process is effective to calculate an average and to put the average back into a central one of the adjacent storage areas or bins and to thereby overcome the effect of such random noise.

DECS ALGORITHM

The five operations performed by DECS that are described above are expressed mathematically by the following algorithm:

| | |
|---|---|
| $e_i = y(t_i) - u(t_i)$ | error slice |
| $z_i = z_i + e_i$ | integration |
| $s_i = s_i - k$ | shift |
| $c_i = a\, s_{i+1} + b\, s_i + a\, s_{i-1}$ | smoothing |
| $v(t_i) = u(t_i) + c_i$ | corrected input | where u is the commanded (desired) value, y the measured value, c the correction to the command input, v is the actual input to the system (corrected input), t an integer representing the $i^{th}$ bin (e.g. $t_i$ is the $i^{th}$ time slice of a cycle and $e_i$ is the value of the error at time $t_i$ which is loaded in the $i^{th}$ bin), k the number of bin shifts, and a and b two constants defining the amount of smoothing (e.g. $a=0$, $b=1$, corresponds to no smoothing, $a=b=\frac{1}{3}$ to maximum smoothing).

As illustrated at the very bottom of FIG. 4, the values, for example, contained in bins B1 through B5 are averaged and that result is then stored in the central bin B3.

Similarly the values contained in bins B2 through B6 are averaged and the average in stored in bin B4.

The output of the digital error correction system as smoothed is then supplied (on the line 53 in FIGS. 1, 2 and 3) to an input of the summing Junction 41. The summing junction 41 combines the correction signal on the line 53 with the analog error compensation signal on the line 39 to supply an adapted control signal on the line 43 to the power amplifier 45 in FIG. 1.

Over a relatively few cycles of operation, such as, for example, 10 to 20 cycles for a sine wave command waveform, the output error will be reduced to near zero so that the actual signal on line 27 will coincide with the desired signal on line 31.

While the time shift illustrated in FIG. 4 shows the correction output as shifted forward by two time segments or bins B, the actual time shift for a particular application will be dependent upon the dynamics of the systems involved.

The number of time segments or bins, B1, B2, etc. selected and used for a particular application is related to the dynamics of operation of that particular system and is also related to the processing power available for time slicing and for the accumulation of errors in the separate storage areas or bins.

In general, a larger number of time slices is preferred, because a large number of time based segments provides individual time based segments which are small enough to provide control resolution effective to remove finely resolved errors.

On the other hand, an excessive number of time slices can stress or overcome the capabilities of the processor and may not provide any actual benefits in operation over some suitable lower number of time slices. For a sine wave type command waveform, 200 time slices per cycle provides quite satisfactory results while 2,000 time slices provide little, if any, measurable improvement over 200 time slices.

With reference now to FIGS. 5–12, a spatial chopping or scanning telescope system, constructed in accordance with one embodiment of the present invention, is indicated by the general reference numeral 101 in FIG. 6. The telescope system 101 embodies an adaptive control for reducing mirror position error to near zero, using the control methods and apparatus graphically illustrated in FIG. 4.

The ability of telescopes operating in the infrared waveband to detect and to measure extremely faint objects can be enhanced by using a technique called "spatial chopping". This technique requires a telescope secondary mirror to execute a rapid back-and-forth motion closely approximating a square wave.

A typical range of operating conditions for a chopping secondary mirror will require the performance of square wave motion at frequencies up to 40 Hertz, with amplitudes up to 30 arc minutes.

High force levels must be achieved in a very short time frame (100 to 400 microseconds).

The motion must be tightly controlled so that no overshoot or jitter is present in the quiescent part of the square wave, where imaging must be performed.

The entire mechanical assembly must be dynamically balanced to prevent transmittal of vibrations to the telescope structure.

For a space vehicle mounted telescope, the requirements for high force levels, wide bandwidth, small size and lightweight pose challenging problems.

The technology involved also makes important advances possible in the performance of scanning mirror systems, highspeed dejitter mirrors and precision deformable optical systems.

Fast scanning mirrors, which may experience edge accelerations on the order of 50 g's are also direct beneficiaries of this technology.

Chopping mirrors have traditionally used mechanical stops to insure an accurate positioning in the motionless part of the cycle. Weight, vibration considerations, and operational flexibility prevent such an approach for space applications.

For an actively controlled system, the control actuators must hold the mirror steady, during the dwell periods of the cycle, with the required accuracy. The control forces needed for that steady operation are small, but the gains must be high to keep the error small.

However, during the transition period, very large forces must be applied, and severe transients are experienced by the electronics with corresponding undesirable nonlinear effects that may lengthen response time and affect performance.

In accordance with the present invention, the mirror position error is kept near zero by using, in combination with a feedback loop, a feed forward loop directly driving the actuators during the transition period as well as during the quiescent period. Using the force-feed-forward technique (compared with a standard position-command-only controller technique) provides the benefit of the ability to eliminate overshoot and ringing, because the force command provides the precise amount of braking required to exactly stop the mirror motion.

A second benefit is the use of a shaped position command. The shaped position command has smooth acceleration and deceleration sections. By causing the control system to follow this smooth path (rather than a bang-bang square wave command), the excitation of structural vibrations is virtually eliminated.

FIG. 5 is a diagrammatic view showing how a mirror 103 of a spatial chopping telescope system, constructed in accordance with one embodiment of the present invention, is moved back and forth between one orientation (in which the object field contains background radiation only) and another orientation (in which the object field contains background radiation plus source radiation—in this case an extended infrared source 105).

This oscillatory motion of the mirror 103 permits a continuous comparison of the two object fields and is a means of further improving the signal-to-noise ratio of very weak infrared sources.

The angle theta (see FIG. 5) through which the mirror 103 is oscillated may typically be about 30 arc minutes when the telescope is used for viewing objects in the infrared region.

As shown in FIG. 6, the mirror 103 is mounted within and is suspended within a housing 107.

A mirror reaction mass 109 is mounted above a baseplate 111 of the housing 107 by a support member 113 and a swivel element 115.

A dashpot 119 is used to damp vibration which might be produced by movement of the mirror actuators 117 (described below).

The lead screw actuator 117 and spring 121 assembly is used to keep the average position of the reaction mass near zero with respect to a nominal position.

The mirror 103 itself is supported and suspended above the mirror reaction mass 109 by three arms of three associated actuators of which only arms 123 and 125 and actuators 127 and 129 are shown in FIG. 6.

The arm 123 is connected to the underside of the mirror 109 by a small flexible post 131.

The arm 125 is connected to the underside of the mirror 103 by a small flexible post 133.

A lead screw actuator 135 and spring 137 assembly, a lead screw actuator 139 and spring 141 assembly, and a third (unshown) lead screw actuator and spring assembly provide the necessary forces to compensate for the gravity forces exerted on the mirror 103 so that the mirror 103 is always balanced in the gravity field.

A set of three position sensors such as 143 and 145 senses a change in angular position of the mirror 103 resulting from energization of the three actuators 127, 129 and the unshown third actuator.

The combination of the forces produced by the three actuators can be varied to change the mirror azimuth, elevation and/or focus.

In FIGS. 5–12, components which correspond generally to components shown in FIGS. 1–4 will be indicated by corresponding reference numerals.

The position of the mirror 103 (the azimuth, elevation and focus) is controlled by a mirror control 21.

FIG. 7 graphically illustrates a generated, desired waveform which includes one cycle of operation of the mirror 103. The waveform illustrated in FIG. 7 is a plot of angle of the mirror versus time. The legends in FIG. 7 indicate events and limits relating to the mirror movement and positioning.

As illustrated in FIG. 7, the mirror has a two dwell times ($t_D$) for each cycle. One dwell time occurs while the mirror is in the first position to view the object field containing background only. The other dwell time occurs during the time when the mirror is in the second orientation in which the object-field contains background radiation plus the extended infrared source radiation 105 as shown in FIG. 5.

There are two transition times ($t_A$) occurring during each cycle of operation. These transition times occur when the mirror is moved from one orientation to the other. Each transition time ($t_A$) is divided into a mirror acceleration period and a mirror deceleration period as indicated in FIG. 7.

In the operation of the oscillating mirror control system, there is a narrow error band for the mean mirror position as indicated in the central part of FIG. 7, and there is a narrow error band for the quiescent portion of the cycle (occurring during the time period ($t_D$) at each of the two orientations).

The transition time ($t_A$) shown in FIG. 7 is, for ease of illustration, drawn considerably out of scale with respect to the dwell time ($t_D$). In a typical spatial chopping cycle, each transition time ($t_A$) Will in fact occupy only about 5% of the total cycle time while each dwell time ($t_D$) will occupy about 45% of the overall cycle time so that there is a 90 to 10 ratio of dwell time to transition time.

Scanning and chopping functions for an actively controlled steering mirror require precise control of mirror angular position and velocity.

In the case of spatial chopping, the duty cycle (or the ratio of time the mirror spends in the observation position to the amount of time required to change position) is important. Control over the mirror acceleration/deceleration profile and damping characteristics is critical.

FIG. 8 illustrates the response of a mirror/control system which has inadequate bandwidth to respond to a high duty cycle angular chop command. The uncorrected mirror response shows all of the characteristics (lagging response, overshoot, and a general degradation in duty cycle and quiescent jitter stability) of insufficient bandwidth in an active mirror system executing a high duty cycle chop.

FIG. 11 shows the general scheme for the adaptive error correction system for the essentially square wave desired command utilized in a high duty cycle angular chopping mirror system of the present invention. The error (which is the difference between the desired waveform and the actual mirror control system output) is sampled by the digital error correction system (DECS) 51. After processing by the algorithm within the DECS 51 (a processing which accumulates measured errors over a number of cycles, multiplies the accumulated error by a gain factor K, and shifts forward in time the correction output to compensate for system dynamics) the correction signal (as shown in the diagram block labeled "correction signal" in FIG. 10) is added to the "desired waveform" (see the diagram block with that legend in FIG. 10) to produce a modified "command waveform" (see the diagram block with that legend in FIG. 10—and see also the command waveform trace labeled "actual" in FIG. 11). This modified command waveform on line 43 is supplied to a related actuator, and the process continues until the position error is driven to near zero.

Thus, for the oscillation in a single plane (and between only two orientations) as represented by FIG. 5 and as produced by the collective effect of the three actuators, the mirror position response with the DECS 51 changes over a number of cycles (and during a relatively short period of time) from the uncorrected response shown in FIG. 9 to the corrected response shown in FIG. 9 so that the corrected response corresponds to the desired waveform with near zero position error.

It should be noted that the chopping or scanning telescope may move the mirror through more than two orientations in a cycle. The mirror may be moved to three, four, or more orientations in each cycle, depending upon the particular application.

The present invention, by utilizing an adaptive digital error correction system, enables the required positioning precision to be obtained without having to resort to an extremely high bandwidth controller. High bandwidth controllers have a tendency to excite structural vibrations inherent in the mechanical system, and high bandwidth controllers have high sensitivity to electrical noise. The present invention thus enables the lowest acceptable bandwidth controller to be utilized so that problems of noise and vibration can be minimized.

As noted above, the control of the mirror for the spatial chopping or scanning system of the present invention controls three axes of mirror movement. Two of the axes are tilting axes (azimuth and the elevation) and one axis is the in-and-out axis (the focus).

FIG. 12 illustrates how the adaptive digital error correction system of the present invention accumulates error correction data for each of these three axes and utilizes the three sets of error correction data to reduce position error for each of the three axes to near zero.

The signals from the three sensors (143, 145 and the one unshown) are combined to generate signals representing the true mirror azimuth, elevation and focus. These signals are then compared with the desired values ("DESIRED COMMANDS" in FIG. 12) to generate three error signals to be used as input to the DECS 51. The three correction signals produced by the DECS 51 are then combined with corrections from the analog control electronics and eventually transformed into commands to the three actuators 127, 129 and the third actuator (not shown).

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A spatial chopping or scanning telescope system of the kind in which a telescope mirror is moved back and forth, in repetitive cycle motions and in a rigidly prescribed pattern, between varied orientations and wherein the mirror is held for a prescribed, relatively long period of time in each orientation and is moved rapidly in a relatively short period of time from one orientation to the other, said telescope system comprising, mirror actuator means for holding the mirror at one orientation, moving the mirror to another orientation, holding the mirror at the other orientation, and moving the mirror back to the first orientation during each cycle of operation, desired signal input means for generating a desired cycle waveform command for operation of the mirror actuator means, mirror position sensing means for sensing the actual position of the mirror, and adaptive control means, connected to the desired signal input means, the mirror actuator means and the mirror position sensing means, for accumulating, over a number of cycles of operation, error correction data relating to the sensed mirror position and for forward time shifting and combining the accumulated error correction data with the desired cycle waveform command for reducing error to near zero in the sensed mirror position after a relatively few cycles of operation and for thereafter maintaining the error near zero during continued repetitive cycles of operation and wherein said forward time shifting and said combining the accumulated error correction data with the desired cycle waveform command produce an adapted cycle waveform command which is not only shifted in time with respect to said desired cycle waveform command but which is also reshaped in amplitude at localized portions of the waveform as required to reduce said error to near zero during said repetitive cycle motions.

2. A spatial chopping or scanning telescope system of the kind in which a telescope mirror is moved back and forth, in repetitive cycle motions and in a rigidly prescribed pattern, between varied orientations and wherein the mirror is held for a prescribed, relatively long period of time in each orientation and is moved rapidly in a relatively short period of time from one orientation to the other, said telescope system comprising, mirror actuator means for holding the mirror at one orientation, moving the mirror to another orientation, holding the mirror at the other orientation, and moving the mirror back to the first orientation during each cycle of operation, desired signal input means for generating a desired cycle command for operation of the mirror actuator means, mirror position sensing means for sensing the actual position of the mirror, and adaptive control means connected to the desired signal input means, the mirror actuator means and the mirror position sensing means for accumulating, over a number of cycles of operation, error correction data relating to the sensed mirror position and for forward time shifting and combining the accumulated error correction data with the desired command for reducing error to near zero in the sensed mirror position after a relatively few cycles of operation and for thereafter maintaining the error near zero during continued cycles of operation, and wherein the adaptive control means comprise, error measuring means for measuring during a cycle of operation the error between the desired cycle command and the sensed mirror position, time slicing means for dividing the error measured during a cycle into a selected number of equal time based segments, storage means for storing corresponding time based segments in related, separate storage areas over a number of cycles to accumulate in each storage area data accurately representing the correction required during that time segment of the cycle, shifting means for shifting the accumulated data in each storage area forward in time, with respect to the time segment in the cycle at which the data was accumulated, by an amount of time represented by a selected number of the time based segments, to enable the required correction to have a lead time required to balance system dynamics, smoothing means for overcoming the effect of random noise which may become stored in one or more of said separate storage areas, converting means for converting the accumulated, time shifted data to a form which can be combined with the desired cycle command, and combining means for combining the converted data with the desired cycle command to produce an adapted, desired cycle command for reducing control system error to near zero.

3. The invention defined in claim 2 wherein the storage means are effective to add new data on each cycle to old data obtained from prior cycles and to store and to accumulate the result obtained by said adding of the new data to the old data.

4. The invention defined in claim 2 wherein the shifting means compensate for the delays introduced by the dynamics of the controlled system.

5. The invention defined in claim 2 including gain means for multiplying the stored data by a gain factor to control the rate of convergence between the adapted, desired cycle command and the output signal representing actual system operation.

6. The invention defined in claim 2 wherein the converting means include a digital to analog converter for converting digital data to an analog form.

7. The invention defined in claim 2 wherein the combining means include a summing junction for summing analog inputs.

8. The invention defined in claim 2 wherein the smoothing means are effective to produce a local averaging process on data stored in a relatively small number of adjacent storage areas and are effective to calculate an average and to put the average back into a central one of said adjacent storage areas.

9. The invention defined in claim 2 wherein the selected number of equal time based segments is a number high enough to provide control resolution effective to remove finely resolved errors measured by the error measuring means.

10. The invention defined in claim 9 wherein the selected number of equal time based segments is within the range of 150 to 200 for a square wave type cycle.

11. A spatial chopping or scanning telescope system of the kind in which a telescope mirror is moved back and forth, in repetitive cycle motions and in a rigidly prescribed pattern, between varied orientations and wherein the mirror is held for a prescribed, relatively long period of time in each orientation and is moved rapidly in a relatively short period of time from one orientation to the other, said telescope system comprising, mirror actuator means for holding the mirror at one orientation, moving the mirror to another orientation, holding the mirror at the other orientation, and moving the mirror back to the first orientation during each cycle of operation, desired signal input means for generating a desired cycle command for operation of the mirror actuator means, mirror position sensing means for sensing the actual position of the mirror, and adaptive control means connected to the desired signal input means, the mirror actuator means and the mirror position sensing means for accumulating, over a number of cycles of operation, error correction data relating to the sensed mirror position and for forward time shifting and combining the accumulated error correction data with the desired command for reducing error to near zero in the sensed mirror position after a relatively few cycles of operation and for thereafter maintaining the error near zero during continued cycles of operation, and wherein the mirror is held in a first orientation for more than 40% of the cycle, the mirror is moved to a second orientation in a time period which is less than 10% of the cycle, the mirror is held at the second orientation for more than 40% of the cycle, and the mirror is moved back to the first orientation in a time period which is less than 10% of the cycle.

12. The invention defined in claim 11 wherein the mirror is moved through an arc of more than one arc minute up to thirty arc minutes in making a transition between one orientation and the other orientation.

13. The invention defined in claim 1 wherein a transition from one orientation to the other is accomplished in less than 10 milliseconds.

14. A spatial chopping or scanning telescope system of the kind in which a telescope mirror is moved back and forth, in repetitive cycle motions and in a rigidly prescribed pattern, between varied orientations and wherein the mirror is held for a prescribed, relatively long period of time in each orientation and is moved rapidly in a relatively short period of time from one orientation to the other, said telescope system comprising, mirror actuator means for holding the mirror at one orientation, moving the mirror to another orientation, holding the mirror at the other orientation, and moving the mirror back to the first orientation during each cycle of operation, desired signal input means for generating a desired cycle command for operation of the mirror actuator means, mirror position sensing means for sensing the actual position of the mirror, and adaptive control means connected to the desired signal input means, the mirror actuator means and the mirror position sensing means for accumulating, over a number of cycles of operation, error correction data relating to the sensed mirror position and for forward time shifting and combining the accumulated error correction data with the desired command for reducing error to near zero in the sensed mirror position after a relatively few cycles of operation and for thereafter maintaining the error near zero during continued cycles of operation, and wherein the mirror actuator means includes three actuators for collectively controlling azimuth, elevation and focus of the mirror and wherein the mirror position sensing means include three position sensors for collectively sensing azimuth position, elevation position and focus position and wherein error correction data is separately accumulated for each of the azimuth, elevation and focus positions.

15. A method for reducing mirror position error to near zero, by anticipating a problem and feeding forward in time a correction to deal with a problem before it happens, in a spatial chopping or scanning telescope system of the kind which is cyclical in operation and which operates in response to repetitive cycle commands so that the operation of the system is substantially predictable for a significant number of cycles of operation, said method comprising, energizing an actuator, during each cycle of operation, to hold a mirror of the telescope system at one orientation for a prescribed period of time, to move the mirror rapidly to another orientation, to hold the mirror at the other orientation for a prescribed period of time, and to move the mirror rapidly back to the first orientation, generating a desired cycle command for energizing the actuator, sensing the actual position of the mirror, measuring during a cycle of operation the error between the desired cycle command and the actual position of the mirror, slicing the error measured during a cycle to divide the error into a selected number of equal time based segments, storing corresponding time based segments in related, separate storage areas over a number of cycles to accumulate in each storage area data accurately representing the correction required during that time segment of the cycle, shifting the accumulated data in each storage area forward in time, with respect to the time segment in the cycle at which the data was accumulated, by an amount of time represented by a selected number of the time based segments, to enable the required correction to have a lead time required to balance system dynamics, smoothing the effect of random noise which may become stored in one or more of said separate storage areas, converting the accumulated, time shifted data to a form which can be combined with the desired cycle command, and combining the converted data with the desired cycle command to produce an adapted, desired cycle command for reducing mirror position error to near zero.

* * * * *